United States Patent
Lai et al.

(10) Patent No.: US 12,137,867 B2
(45) Date of Patent: Nov. 12, 2024

(54) METHOD FOR CORRECTING DETERMINATION THRESHOLD OF FLOOR MEDIUM AND METHOD OF DETECTING THEREOF

(71) Applicant: AMICRO SEMICONDUCTOR CO., LTD., Guangdong (CN)

(72) Inventors: Qinwei Lai, Guangdong (CN); Liying Huang, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 327 days.

(21) Appl. No.: 17/630,152

(22) PCT Filed: Nov. 11, 2019

(86) PCT No.: PCT/CN2019/117265
§ 371 (c)(1),
(2) Date: Jan. 25, 2022

(87) PCT Pub. No.: WO2021/031395
PCT Pub. Date: Feb. 25, 2021

(65) Prior Publication Data
US 2022/0280005 A1 Sep. 8, 2022

(30) Foreign Application Priority Data
Aug. 20, 2019 (CN) .......................... 201910770711.X

(51) Int. Cl.
A47L 9/28 (2006.01)
B25J 9/00 (2006.01)

(52) U.S. Cl.
CPC ........... *A47L 9/2826* (2013.01); *A47L 9/2836* (2013.01); *B25J 9/0003* (2013.01); *A47L 2201/06* (2013.01)

(58) Field of Classification Search
CPC .. A47L 9/2826; A47L 9/2836; A47L 2201/06; B25J 9/0003; G01N 2291/0258;
(Continued)

(56) References Cited

U.S. PATENT DOCUMENTS 7,424,766 B2 * 9/2008 Reindle ................ A47L 9/2826
15/340.1
2005/0278888 A1 12/2005 Reindle et al.
(Continued)

FOREIGN PATENT DOCUMENTS

| CN | 1242692 A | 1/2000 |
|----|-----------|--------|
| CN | 104255019 A | 12/2014 |

(Continued)

OTHER PUBLICATIONS

The first office action of patent family AU application No. 2019462239 issued on Dec. 19, 2022.
(Continued)

*Primary Examiner* — Rachid Bendidi
(74) *Attorney, Agent, or Firm* — Samson G. Yu

(57) ABSTRACT

A method for correcting a determination threshold of a floor medium and a method of detecting thereof are provided. The method is used for controlling a mobile robot equipped with a sound emitter and a sound receiver to detect and recognize the floor medium during a movement just started. A first detection result of a current floor medium is obtained by actively transmitting and receiving a sound signal, then, a to-be-adjusted detection result of the current floor medium is obtained only by passively receiving the sound signal through the sound receiver, and according to the similarity/difference of the two detection results, the determination threshold is corrected in the case of passively receiving the sound signal, so that the to-be-adjusted detection result is determined to be consistent with the first detection result.

11 Claims, 3 Drawing Sheets

(58) Field of Classification Search
CPC .... G01N 29/14; G01N 29/225; G01N 29/265; G01N 29/4463; G01N 2291/0235; G01N 29/4427; G01N 29/48; G01N 29/11; G10L 25/18; G10L 25/51
See application file for complete search history.

(56) References Cited

U.S. PATENT DOCUMENTS

| | | | | |
|---|---|---|---|---|
| 2013/0231819 | A1* | 9/2013 | Hung | A47L 11/4011 |
| | | | | 901/1 |
| 2013/0232717 | A1 | 9/2013 | Lee et al. | |
| 2014/0088761 | A1* | 3/2014 | Shamlian | G01B 11/026 |
| | | | | 700/253 |
| 2014/0166047 | A1* | 6/2014 | Hillen | G05D 1/0274 |
| | | | | 15/49.1 |

FOREIGN PATENT DOCUMENTS

| | | |
|---|---|---|
| CN | 204129525 U | 1/2015 |
| CN | 107625486 A | 1/2018 |
| CN | 109008778 A | 12/2018 |
| CN | 109907703 A | 6/2019 |
| CN | 110018239 A | 7/2019 |
| EP | 0474542 A3 | 1/1993 |
| JP | H01219663 A | 9/1989 |
| JP | H04233453 A | 8/1992 |
| JP | H07313418 A | 12/1995 |
| KR | 100820740 B1 | 4/2008 |
| WO | 2021031395 A1 | 2/2021 |

OTHER PUBLICATIONS

The Supplementary search report of patent family EP application No. 19942495.3 issued on Aug. 8, 2022.

* cited by examiner

METHOD FOR CORRECTING DETERMINATION THRESHOLD OF FLOOR MEDIUM AND METHOD OF DETECTING THEREOF

The present disclosure claims priority of Chinese Patent Application No. 201910770711.X, filed to China National Intellectual Property Administration on 20 Aug. 2019 and entitled "Method for correcting determination threshold of floor medium and method of detecting thereof", the disclosure of which is incorporated herein by reference in its entirety.

TECHNICAL FIELD

The disclosure belongs to the technical field of floor medium detection, and particularly relates to a method for correcting a determination threshold of a floor medium and a method of detecting a floor medium.

BACKGROUND ART

A Chinese patent No. 2019102688381 discloses a carpet detection method, which specifically collects sound reflected by a floor medium and generated when a main brush and a fan within a robot operate through a sound sensor; according to differences of absorption effects of a carpet on harmonic waves of different frequency bands in a sound signal, within a limited range of a response frequency band of an internal circuit of the sound sensor, an amplitude value of a high frequency component of the carpet which absorbs scattering obviously is selected; and the amplitude value is compared with a preset threshold serving as a reference amplitude value to complete carpet detection.

However, after the robot is used for a period of time, various motors and mechanical parts may be aged, a noise environment may be changed, and at the moment, a sweeper collects that an audio signal reflected by a floor may be changed, so that an error of recognition of the floor medium by the robot through sound analysis is large because the preset threshold which is set by a factory and is taken as the reference amplitude value cannot be suitable for all states of the robot.

SUMMARY

A method for correcting a determination threshold of a floor medium. The method is used for controlling a mobile robot equipped with a sound emitter and a sound receiver to correct a parameter for detecting the floor medium during a movement just started. The correction method includes that: S1, the sound emitter is controlled to transmit a sound signal of a first preset frequency, at the same time, the sound receiver is controlled to receive the sound signal, and then, according to a relationship between an amplitude of the sound signal received and a first preset determination threshold, a first detection result of the current floor medium is determined, and the first preset determination threshold is a fixed experience value obtained through an experimental test, and the first detection result is information of a type of the current floor medium; S2, after determining the first detection result, transmission of the sound signal by the sound emitter is stopped, only the sound receiver is controlled to receive the sound signal, and then, according to a relationship between a frequency domain transformation result of the sound signal received and a second preset determination threshold, a to-be-adjusted detection result of the current floor medium is determined, the second preset determination threshold supports adjustment and correction, and the to-be-adjusted detection result is the information of the type the current floor medium; and S3, whether the first detection result is the same as the to-be-adjusted detection result is determined, in the case that the first detection result is the same as the to-be-adjusted detection result, the second preset determination threshold is kept unchanged, and in the case that the first detection result is not the same as the to-be-adjusted detection result, the second preset determination threshold is corrected so that the to-be-adjusted detection result obtained by returning to S2 is consistent with the first detection result, the second preset determination threshold is an adjustable margin.

Optionally, in S1, according to the relationship between the amplitude of the sound signal received and the first preset determination threshold, determining first detection result of the current floor medium includes that: an amplitude of a to-be-detected signal of the first preset frequency is extracted from the sound signal received in S1; and whether the amplitude of the to-be-detected signal of the first preset frequency is less than the first preset determination threshold is determined, in the case that the amplitude of the to-be-detected signal of the first preset frequency is less than the first preset determination threshold, the first detection result of the current floor medium is determined to be a carpet, and in the case that the amplitude of the to-be-detected signal of the first preset frequency is not less than the first preset determination threshold, the first detection result of the current floor medium is determined to be a hard floor. The first preset determination threshold is used for measuring an attenuation capacity of the current floor medium to the to-be-detected signal of the first preset frequency. The sound signal of the first preset frequency is a sound wave signal of a special frequency modulated and transmitted by the sound emitter.

Optionally, in S2, according to the relationship between the frequency domain transformation result of the sound signal received and the second preset determination threshold, determining to-be-adjusted detection result of the current floor medium includes that: frequency domain transformation of the sound signal received in S2 is performed, and an amplitude value of a to-be-detected frequency domain signal of a second preset frequency is extracted; and whether the amplitude value of the to-be-detected frequency domain signal of the second preset frequency is less than the second preset determination threshold is determined, in the case that the amplitude value of the to-be-detected frequency domain signal of the second preset frequency is less than the second preset determination threshold, the to-be-adjusted detection result of the current floor medium is determined to be the carpet, and in the case that the amplitude value of the to-be-detected frequency domain signal of the second preset frequency is not less than the second preset determination threshold, the to-be-adjusted detection result of the current floor medium is determined to be the hard floor. The second preset determination threshold is used for measuring an attenuation capability of the current floor medium to the sound signal of a high frequency band. The second preset frequency is a high frequency component in a response frequency band obtained through the frequency domain transformation of the sound signal received by the sound receiver in real time.

Optionally, in S3, correcting the second preset determination threshold includes that: in a case that the first detection result is the carpet and the to-be-adjusted detection result is the hard floor, the second preset determination threshold is increased until the amplitude value of the to-be-detected frequency domain signal of the second preset frequency is less than the second preset determination threshold, so that the to-be-adjusted detection result obtained by returning to S2 is determined to be the same as the first detection result; in a case that the first detection result is the carpet and the to-be-adjusted detection result is the carpet, the second preset determination threshold is kept unchanged, so that the to-be-adjusted detection result obtained by returning to S2 is kept unchanged; in a case that the first detection result is the hard floor and the to-be-adjusted detection result is the carpet, the second preset determination threshold is reduced until the amplitude value of the to-be-detected frequency domain signal of the second preset frequency is greater than the second preset determination threshold, so that the to-be-adjusted detection result obtained by returning to S2 is determined to be the same as the first detection result; and in a case that the first detection result is the hard floor and the to-be-adjusted detection result is the hard floor, the second preset determination threshold is kept unchanged, so that the to-be-adjusted detection result obtained by returning to S2 is kept unchanged. The amplitude value of the to-be-detected frequency domain signal of the second preset frequency is a signal amplitude value which is received by the sound receiver in real time and obtained through the frequency domain transformation.

Optionally, the adjustable margin has a proportional relationship with the amplitude value of the to-be-detected frequency domain signal of the second preset frequency obtained through real-time processing.

A method of detecting a floor medium is provided. The method is used for controlling a mobile robot equipped with a sound emitter and a sound receiver to detect the floor medium in a moving process. The mobile robot starts to detect the floor medium after being started. The method includes that: S1, the mobile robot is controlled to execute the foregoing method; S2, in a case that a foregoing first detection result is the same as a foregoing to-be-adjusted detection result, the to-be-adjusted detection result is taken as an effective detection result of the current floor medium, and S1 is returned; S3, whether the first detection result obtained in S1 is the same as the effective detection result of the current floor medium is determined, in the case that the first detection result obtained in S1 is the same as the effective detection result of the current floor medium is determined, S2 is continued to be executed, and the effective detection result of the current floor medium is updated with the to-be-adjusted detection result obtained in S2, and in the case that the first detection result obtained in S1 is not the same as the effective detection result of the current floor medium is determined, S2 and S3 are continued to be executed. The effective detection result of the current floor medium is a detection result which influences a moving strategy of the mobile robot on the current floor medium.

Optionally, in the case that the first detection result obtained in S1 is not the same as the effective detection result of the current floor medium is determined, continuing to execute S2 and S3, and then returning to S2 includes that: in a case that the first detection result is a carpet and the to-be-adjusted detection result is a hard floor, a second preset determination threshold is increased until an amplitude value of a to-be detected frequency domain signal of a second preset frequency is less than the second preset determination threshold, then S2 is returned to determine that the to-be-adjusted detection result is changed from the hard floor to the carpet, and the carpet is taken as the effective detection result of the current floor medium; in a case that the first test result is the carpet and the to-be-adjusted test result is the carpet, the second preset determination threshold is kept unchanged, and the carpet is taken as the effective detection result of the current floor medium; in a case that the first detection result is the hard floor and the to-be-adjusted detection result is the carpet, the second preset determination threshold is reduced until the amplitude value of the to-be detected frequency domain signal of the second preset frequency is greater than the second preset determination threshold, then S2 is returned to confirm that the to-be-adjusted detection result is changed from the carpet to the hard floor, and the hard floor is taken as the effective detection result of the current floor medium; and in a case that the first detection result is the hard floor and the to-be-adjusted detection result is the hard floor, the second preset determination threshold is kept unchanged, and the hard floor is taken as the effective detection result of the current floor medium.

DETAILED DESCRIPTION OF THE EMBODIMENTS

The technical solution in the embodiment of the disclosure will be described below in detail with reference to the accompanying drawings in the embodiment of the disclosure.

The embodiment of the disclosure provides a method for correcting a determination threshold of a floor medium. The method is used for controlling a mobile robot equipped with a sound emitter and a sound receiver to correct a parameter for detecting the floor medium during a movement just started so as to be adapted to a current aging state of a machine. According to the disclosure, the sound emitter is added on the basis of a Chinese patent No. 2019102688381, and a parameter for detecting the floor medium is corrected in cooperation with information of detecting of the sound receiver, so that incorrect determination in the process of detecting the floor medium after a mobile robot is started is avoided. The sound emitter and the sound receiver are mounted on a chassis of the mobile robot. The sound emitter and the sound receiver are sensors for detecting an audio signal and then sending the audio signal to a processor to analyze the audio signal. The sound emitter and the sound receiver are separated from each other by a sound insulation structure. An effect of detecting of a reflected sound of the floor medium is improved. Meanwhile, the sound emitter and the sound receiver are also separated from the chassis of external of the mobile robot through sound insulation material, thereby avoiding an influence of noise of machine body conduction.

When the mobile robot is used for sweeping, loud sound is generated by rotating a main brush (a fan), the sound is made on a hard floor, for example, a tile and the like, the sound is relatively rich in high frequency signal and large in amplitude, while on the carpet, high frequency signals of the sound are inhibited, meanwhile, an overall amplitude of the sound is reduced, and the whole sounds are reflected by the floor, conducted by a machine body and received by a sound receiver, and through floor reflection and machine body conduction, the sound is received by the sound receiver. Therefore, the embodiment distinguishes whether the floor medium is a carpet through these features. However, after the mobile robot is used for a period of time, various motors and mechanical parts may be aged, an environment may also be changed, at the moment, an audio signal collected by the sound receiver is also changed, and incorrect detection is liable to occur.

Figure 1:
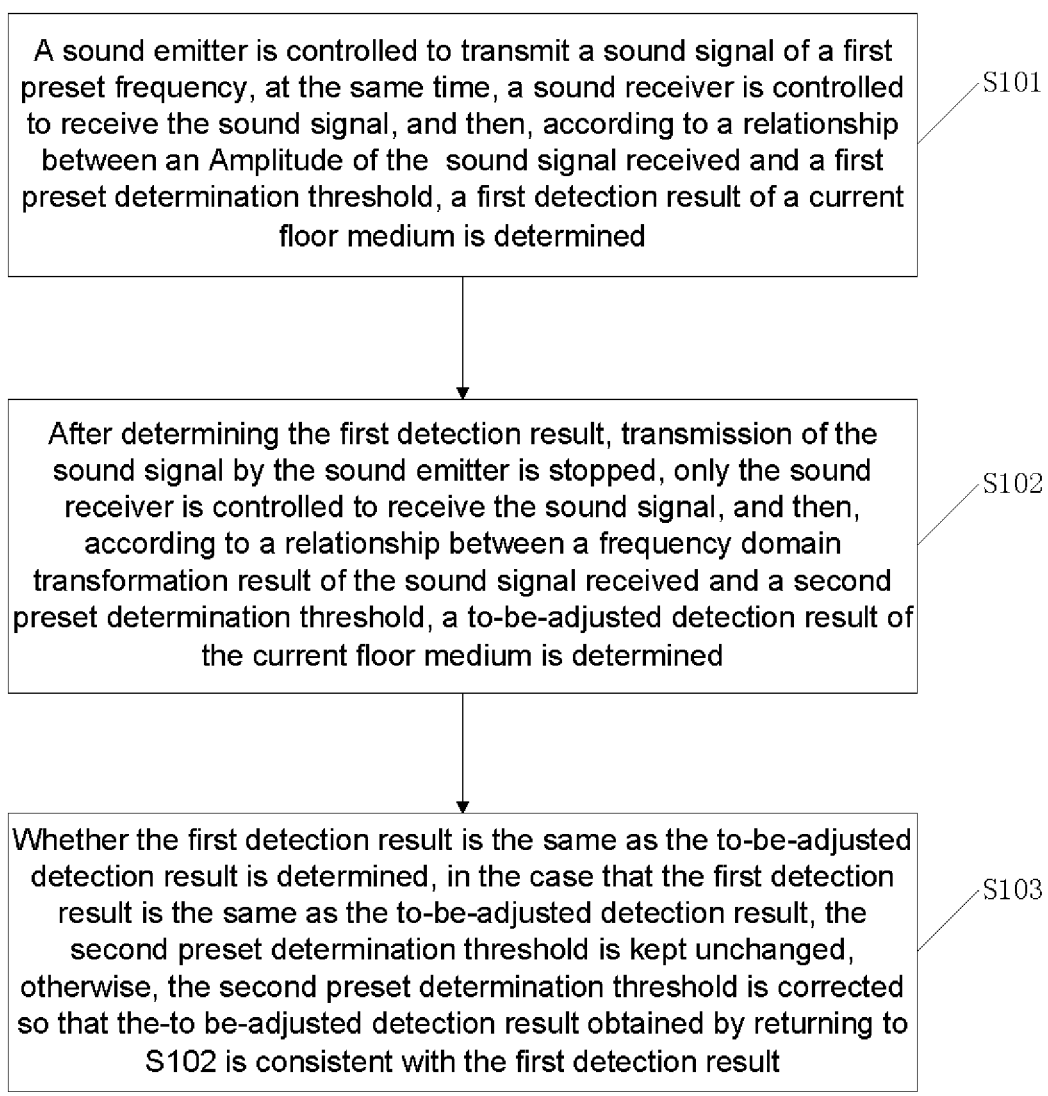
FIG. 1 is a flow chart of a method for correcting a determination threshold of a floor medium provided by one embodiment of the disclosure.

To overcome an influence of mechanical aging and environment noise in a process of detecting a floor medium through a sound signal, the embodiment of the disclosure provides a method for correcting a determination threshold of a floor medium, which is applicable to a state that the mobile robot is just started to move. As shown in FIG. 1, the method specifically includes that: S101, the sound emitter is controlled to transmit a sound signal of a first preset frequency, at the same time, the sound receiver is controlled to receive a sound signal, then a first detection result of the current floor medium is determined by extracting and analyzing a relationship between an amplitude of the sound signal at the first preset frequency and a first preset determination threshold, and then S102 is entered, the first preset determination threshold is a fixed experience value obtained through an experimental test, and the first detection result is information of a type of the current floor medium. When the mobile robot is located on the carpet, an amplitude value of a reflected signal is reduced due to obvious absorption effect of the carpet, while absorption of the hard floor is less, so that the carpet and the hard floor may be distinguished by comparing an amplitude value of a reflected signal received by the sound receiver with a magnitude relationship of the first preset determination threshold. At the moment, the sound signal at the first preset frequency extracted by the sound receiver is dominated by the sound signal at the first preset frequency transmitted by the sound emitter. However, an influence of noise of the other same frequency outside is not excluded. Since the sound signal of the first preset frequency is a sound wave signal of specific frequency modulated and transmitted by the sound emitter, the sound signals of the first preset frequency transmitted from the outside are very few. The sound signal at the first preset frequency is extracted and analyzed for the first time to detect that the floor medium is not influenced by the sound generated when the main brush and the fan within the mobile robot operate. However, it is not included that a small amount of extra noise in addition to machine operation noise may be introduced.

S102, after determining the first detection result, transmission of the sound signal by the sound emitter is stopped, only the sound receiver is controlled to receive the sound signal, then, according to a relationship between a frequency domain transformation result of the sound signal received and a second preset determination threshold, a to-be-adjusted detection result of the current floor medium is determined, and then 103 is entered, the second preset determination threshold supports adjustment and correction, and the to-be-adjusted detection result is the information of the type the current floor medium. A type of the current floor medium is determined through the first detection in S101 This result is not influenced by the sound generated by when the main brush and the fan within the mobile robot operate. However, it is not excluded that the sound emitter may cause a small amount of additional noise in addition to machine operation noise. Therefore, after the first detection is completed, the transmission of the sound signal by the sound emitter is stopped, and only the sound receiver is controlled to receive the sound signal. At the moment, the turn-off sound emitter does not transmit the sound signal of the first preset frequency, and noise pollution to human ears is avoided. The sound receiver collects a section of sound after the mobile robot is started as an analysis sample, and at the moment, the collected sound signal is mainly from the noise of the main brush of the machine. Since a moving distance of the mobile robot is small, it may be considered that material of the floor is not changed. That is, the mobile robot does not move from the hard floor to the carpet, or from the carpet to the hard floor. The floor medium is then detected again by analyzing the sound signal received. Frequency domain transformation is performed on the sound signal received, and the amplitude value of the to-be-detected frequency domain signal of a second preset frequency is extracted from a frequency domain. According to the relationship between the amplitude value and the second preset determination threshold, the to-be-adjusted detection result of the current floor medium is determined.

It will be appreciated that under the embodiment, the mobile robot serves as a cleaning robot. A cleaning assembly is equipped on a chassis of the cleaning robot, for example, the main brush is equipped for collecting waste, and the fan is built-in for cleaning dust. In general, the carpet is liable to be damaged during mopping working, so that the floor medium needs to be detected and identified during the movement of the mobile robot just started. The sound generated by operation of the main brush and the fan within the mobile robot may be transmitted to the floor and reflected. An amplitude of the sound generated by the operation of the main brush and the fan is relatively large and is dominant in a cleaning working process, so that the transmission of the sound signal by the sound emitter is stopped, and only the sound receiver is controlled to receive the sound signal, and the obtained sound signal is the sound signal which is conducted to the floor and reflected back to the sound receiver when the main brush and the fan within the mobile robot operate.

S103, whether the first detection result is the same as the to-be-adjusted detection result is determined, in the case that the first detection result is the same as the to-be-adjusted detection result, the second preset determination threshold is kept unchanged, in the case that the first detection result is not the same as the to-be-adjusted detection result, the second preset determination threshold is corrected, and S102 is returned so that the to-be-adjusted detection result obtained by returning to S102 to detect sound signal reflected on the same floor medium in real time is determined to be consistent with the first detection result. If the first detection result is determined to be different from the to-be-adjusted detection result, the second preset determination threshold is corrected first to be less than the frequency domain transformation result of the sound signal currently received, and then S102 is returned to determine the to-be-adjusted detection result. The second preset determination threshold may also be corrected first according to an adjustable margin, and then S102 is returned to compare the second preset determination threshold corrected with the frequency domain transformation result of the sound signal received in real time. The second preset determination threshold is an adjustable margin, the adjustable margin is an experience range value obtained through an experimental test at certain proportion according to the frequency domain transformation result of the sound signal received, and an accuracy of a subsequent correction result may be improved.

An initial value of the second preset determination threshold is set in a factory state of the machine.

In the embodiment, the first detection result may be considered to be a pre-detection result of the floor medium obtained through active transmission of the sound signal for detecting the first preset frequency by the sound emitter. Although the sound signal is not influenced by machine aging, additional noise in addition to the operation noise of the machine is brought. The additional noise is the sound signal of the first preset frequency and is noise for the human ears. On the other hand, the to-be-adjusted detection result of the floor medium is obtained by performing spectral analysis on the sound generated by the operation of the main brush and the fan in the operation process of the machine. However, as the state of the machine is changed (aged), the operation of the above machine is also changed. Therefore, a mode of comparing a signal amplitude value of a high frequency band obtained by the spectral analysis with a fixed preset determination threshold at the factory to obtain the to-be-detected detection result of the floor medium cannot be applicable to all situations. Therefore, if the second preset determination threshold is used in the embodiment, correction is required according to a current pre-detection result of the floor medium and a current re-detection result of the floor medium, so that the detection result obtained under a corrected preset determination threshold condition is consistent with the first detection result, and the second preset determination threshold is adapted to a current aging state of the machine. According to the embodiment of the disclosure, the second preset determination threshold is corrected according to the similarity/difference between the first detection result and the to-be-adjusted detection result, so that in the process of detecting the current floor medium, the determination threshold corrected may solve a problem of inaccurate sound analysis caused by long-term operation aging of the machine and avoid incorrect determination occurring in the process of detecting the floor medium after the mobile robot is started. Meanwhile, after the second preset determination threshold is obtained, the sound emitter does not need to be turned on the same floor medium to transmit an audio signal of a specific frequency to detect a pre-detection result of the floor medium, the type of the floor medium may be determined only by judging the sound signal collected by the sound receiver by using the second preset determination threshold, and the noise pollution to the human ears caused by the audio signal of the first preset frequency transmitted by the sound emitter is reduced.

Preferably, the sound receiver may be a MEMS microphone or an electret microphone. The sound emitter may be a buzzer, specifically, a piezoelectric ceramic buzzer.

Figure 2:
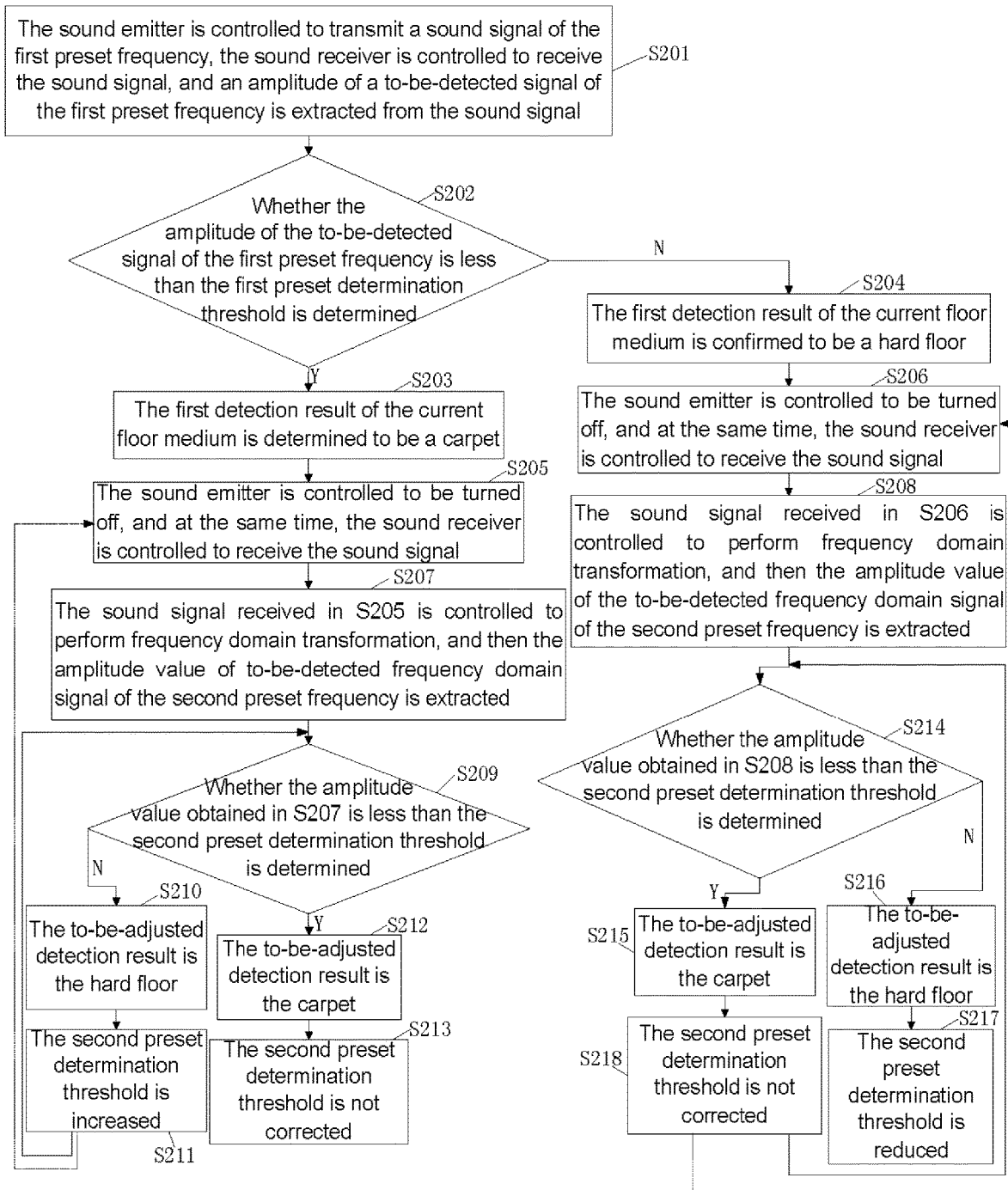
FIG. 2 is a flow chart of a method for correcting a determination threshold of a floor medium provided by another embodiment of the disclosure.

As one embodiment, as shown in FIG. 2, the method is used for controlling a mobile robot equipped with the sound emitter and the sound receiver to detect the floor medium during the movement just started. The method specifically includes:

S201, the sound emitter is controlled to transmit a sound signal of the first preset frequency; and at the same time, the sound receiver is controlled to receive the sound signal and then transfer the sound signal received to a band-pass filter, the band-pass filter extracts a to-be-detected signal of the first preset frequency, an amplitude of the to-be-detected signal of the first preset frequency is extracted from the sound signal, and then S202 is entered. Since the sound signal of the first preset frequency is a sound wave signal of special frequency modulated and transmitted by the sound emitter, the sound signal has the characteristic of specificity and is not liable to be influenced by changing noise caused by various machine aging states. Therefore, the sound signals of the first preset frequency transmitted from the outside are very few and are not influenced by the sound generated when the main brush and the fan within the mobile robot operate, however, it is not excluded that additional noise in addition to machine operation noise is brought, and the sound signal of the first preset frequency is noise for people.

S202, whether the amplitude of the to-be-detected signal of the first preset frequency is less than the first preset determination threshold is determined, in the case that the amplitude of the to-be-detected signal of the first preset frequency is less than the first preset determination threshold, S203 is entered, and in the case that the amplitude of the to-be-detected signal of the first preset frequency is not less than the first preset determination threshold, S204 is entered. An amplitude value of the sound signal collected by the sound receiver is relatively stable, and an amplitude value of the to-be-detected signal extracted of the first preset frequency obtained through hard floor reflection is obviously greater than that of the carpet, so that the first preset determination threshold may be used for distinguishment. The first preset determination threshold is used for measuring an attenuation capability of the floor medium to a to-be-detected frequency domain signal of the first preset frequency, extraction and analysis of the sound signal of the first preset frequency are performed without being influenced by the sound generated when the main brush and the fan within the mobile robot operate, so that the first preset determination threshold may be a preset fixed threshold.

S203, the first detection result of the current floor medium is determined to be a carpet, and then S205 is entered. When the mobile robot is located on the carpet, the absorption effect of the carpet is obvious, so that an attenuation amplitude of the signal reflected of the sound signal is greater than the first preset determination threshold. When the mobile robot is located on the hard floor, a sound wave absorbed by the hard floor is relatively small, so that the attenuation amplitude of the signal reflected of the sound signal is less than the first preset determination threshold.

S205, the sound emitter is controlled to be turned off, at the same time, the sound receiver is controlled to receive the sound signal, and then S207 is entered.

The sound receiver is used for collecting a section of sound after the mobile machine is started as an analysis sample, at the moment, the sound signal collected mainly comes from the noise of the main brush of the machine reflected through the floor, the sound signal of the first preset frequency cannot be generated, and the noise pollution is reduced.

S207, the sound signal received in S205 is controlled to perform frequency domain transformation, and then the amplitude value of the to-be-detected frequency domain signal of the second preset frequency is extracted. Then, the frequency domain transformation is performed on the analyzed sample to extract the amplitude value of the to-be-detected frequency domain signal of the second preset frequency, and then S209 is entered. In the embodiment, the sound signal collected by the sound receiver is an analog waveform formed by superposing continuous harmonic waves in a time domain, specifically, formed by superposing an infinite number of sinusoidal waves together. When the waveform is transformed from the time domain to a frequency domain, each of the sinusoidal waves decomposed in the time domain corresponds to each frequency component in the frequency domain. Each frequency component has a corresponding amplitude value. A high frequency component is used as the second preset frequency for judging the floor medium in a subsequent step. In the embodiment, the second preset frequency is selected to be 6 KHz. The reason why the 6 KHz is selected is that the amplitude of a high frequency part is relatively small and is discretely distributed, and a limit of an allowable error range in a response band of the sound receiver also needs to be taken into consideration. It is ensured that the amplitude value of the extracted high frequency component is valid.

S209, whether the amplitude value of the to-be-detected frequency domain signal of the second preset frequency obtained in S207 is less than the second preset determination threshold is determined, in the case that the amplitude value of the to-be-detected frequency domain signal of the second preset frequency obtained in S207 is less than the second preset determination threshold, S212 is entered, and in the case that the amplitude value of the to-be-detected frequency domain signal of the second preset frequency obtained in S207 is not less than the second preset determination threshold, S210 is entered. The second preset determination threshold is a variable margin set on the basis of the amplitude value of the to-be-detected frequency domain signal of the second preset frequency, a change of a mechanical aging state may cause the sound signal transmitted to the floor medium to be changed, and particularly, the current amplitude corresponding to the second preset frequency is changed relative to an initial amplitude.

S212, the to-be-adjusted detection result is determined to be the carpet, the first detection result obtained in S203 is the carpet and is the same as the to-be-adjusted detection result determined in the step, this indicates that the current second preset determination threshold cannot be incorrectly determined due to changing of the noise generated by mechanical aging and is adapted to a current state of the machine, and then S213 is entered.

S213, the second preset determination threshold is not corrected, and on the basis of the method, the detection result when the mobile robot starts to move is determined as follows that: the floor medium is the carpet.

S210, the to-be-adjusted detection result of the current floor medium is determined to be the hard floor, at the moment, the first detection result obtained in S203 is the carpet and is different from the to-be-adjusted detection result currently determined, this indicates that the current second preset determination threshold is incorrectly determined due to the changing of the noise generated by mechanical aging and is not adapted to the current state of the machine, and then S211 is entered to adjust the threshold.

S211, the second preset determination threshold is increased, so that the amplitude value obtained in S207 is less than the second preset determination threshold increased, and then S209 is returned. Or, according to the amplitude value of the to-be-detected frequency domain signal of the second preset frequency obtained in S207, a ratio greater than one is taken to obtain a margin, a corrected second preset determination threshold is obtained, and then S205 is returned (as indicated by a dotted arrow in FIG. 2) to determine an amplitude value of a signal newly received by the sound receiver and obtained through the frequency domain transformation again, so that the to-be-adjusted detection result determined is corrected to the carpet. The margin which is set on the basis of the amplitude value of the to-be-detected frequency domain signal of the second preset frequency is changed, and the second preset determination threshold adjusted has a ratio greater than one relative to an amplitude value in a high frequency band of the to-be-detected frequency domain signal. The margin is automatically adjusted along with the change of the mechanical aging state in the operation process of the mobile robot, and an initial margin is obtained through repeated mechanical aging tests and noise tests. The correction of the preset determination threshold is facilitated to be adapted to the state of the current machine, and the accuracy of the carpet detection result is ensured.

If the second preset determination threshold set by the factory is 50, the amplitude value of the to-be-detected frequency domain signal of the second preset frequency obtained in S207 is 58, and the floor medium obtained through detection for the first time in S203 is the carpet. If the amplitude value obtained in S207 is greater than the second preset determination threshold, in S209, the to-be-adjusted detection result of the floor medium is determined to be the hard floor. However, this to-be-adjusted detection result is different from the first detection result of S203, this indicates that the set second preset determination threshold is too small. At the moment, S211 is entered to increase the second preset determination threshold to 60. The second preset determination threshold is enabled to be greater than 58, and in S209, the to-be-adjusted detection result of the floor medium is determined to be the hard floor. Here, 60 is a result obtained on the basis of 58 at a certain ratio. It indicates that the second preset determination threshold increased is adapted to the current machine state and is not influenced by the machine aging.

If the second preset determination threshold set by the factory is 50, the amplitude value of the to-be-detected frequency domain signal of the second preset frequency obtained in S207 is 48, and the floor medium obtained through detection for the first time in S203 is the carpet. If the amplitude value obtained in S207 is less than the second preset determination threshold, in S209, the to-be-adjusted detection result of the floor medium is determined to be the carpet. This to-be-adjusted detection result is the same as the first detection result of S204, and this indicates that the second preset determination threshold is suitable for the current machine state and is not influenced by the machine aging.

S204, the first detection result of the current floor medium is determined to be the hard floor, and then S206 is entered. When the mobile robot is located on the hard floor, since the absorption effect of the hard floor is not obvious, the attenuation amplitude of the signal reflected of the to-be-detected signal of the first preset frequency is less than that of the first preset determination threshold.

S206, the sound emitter is controlled to be turned off, at the same time, the sound receiver is controlled to receive the sound signal, and then S208 is entered. The sound receiver is used for collecting a section of sound after the mobile machine is started as an analysis sample, at the moment, the collected sound signal mainly comes from the noise of the main brush of the machine reflected through the floor, however, there is no noise pollution caused by the to-be-detected signal of the first preset frequency.

S208, the sound signal received in S206 is controlled to perform frequency domain transformation, and then the amplitude value of the to-be-detected frequency domain signal of the second preset frequency is extracted. Then, the frequency domain transformation is performed on the analyzed sample to extract the amplitude value of the to-be-detected frequency domain signal of the second preset frequency, and then S214 is entered. In the embodiment, the sound signal collected by the sound receiver is an analog waveform formed by superposing continuous harmonic waves in a time domain, specifically, formed by superposing an infinite number of sinusoidal waves together. When the waveform is transformed from the time domain to a frequency domain, each of the sinusoidal waves decomposed in the time domain corresponds to each frequency component in the frequency domain. Each frequency component has a corresponding amplitude value. A high frequency component is used as the second preset frequency for judging the floor medium in a subsequent step. In the embodiment, the second preset frequency is selected to be 6 KHz. The reason why the 6 KHz is selected is that an amplitude of a high frequency part is relatively small and is discretely distributed and a limit of an allowable error range in a response band of the sound receiver also needs to be taken into consideration. It is ensured that the amplitude value of the high frequency component extracted is valid.

S214, whether the amplitude value of the to-be-detected frequency domain signal of the second preset frequency obtained in S208 is less than the second preset determination threshold is determined, in the case that the amplitude value of the to-be-detected frequency domain signal of the second preset frequency obtained in S208 is less than the second preset determination threshold, S215 is entered, and in the case that the amplitude value of the to-be-detected frequency domain signal of the second preset frequency obtained in S208 is not less than the second preset determination threshold, S216 is entered. The second preset determination threshold is a variable margin set on the basis of the amplitude value of the to-be-detected frequency domain signal of the second preset frequency, a change of a mechanical aging state may cause the sound signal transmitted to the floor medium to be changed, and particularly, the current amplitude corresponding to the second preset frequency is changed relative to the initial amplitude.

S215, the to-be-adjusted detection result is determined to be the carpet, at the moment, the first detection result obtained in S204 is the hard floor and is different from the to-be-adjusted detection result determined in S215, this indicates that the current second preset determination threshold is incorrectly determined due to the noise generated by the mechanical aging and is not adapted to a current state of the machine, and then S218 is entered.

S218, the second preset determination threshold is reduced, so that the amplitude value obtained in S208 is less than the second preset determination threshold reduced, and then S214 is returned. Or, according to the amplitude value of the to-be-detected frequency domain signal of the second preset frequency obtained in S208, the ratio less than 1 is taken to obtain a margin, a corrected second preset determination threshold is obtained, and then S206 is returned (as indicated by a dotted arrow in FIG. 2) to determine the signal amplitude value newly received by the sound receiver and obtained through the frequency domain transformation again, so that the determined to-be-adjusted detection result is corrected to the hard floor. The margin which is set on the basis of the amplitude value of the to-be-detected frequency domain signal of the second preset frequency is changed, and the second preset determination threshold adjusted has a ratio less than 1 relative to the amplitude value in a high frequency band of the to-be-detected frequency domain signal. The margin is automatically adjusted along with the change of the mechanical aging state in the operation process of the mobile robot, and the initial margin is obtained through repeated mechanical aging tests and noise tests. The correction of the preset determination threshold is facilitated to be adapted to the state of the current machine, and the accuracy of the carpet detection result is ensured.

S216, the to-be-adjusted detection result is determined to be the hard floor, the first detection result obtained in S204 is the hard floor and is the same as the to-be-adjusted detection result determined in the step, this indicates that the current second preset determination threshold cannot be incorrectly determined due to the changing of the noise generated by mechanical aging and is adapted to a current state of the machine, and then S217 is entered.

S217, the second preset determination threshold is not corrected, and on the basis of the method, the detection result when the mobile robot starts to move is determined as follows that: the floor medium is the hard floor.

Compared with the conventional art that adopting a fixed preset determination threshold at the factory, the embodiment has the following advantage that by comparing the first detection result with the to-be-detected result, the second preset determination threshold is corrected in the case that only the sound receiver is controlled to passively receive the sound signal, so that the determination threshold is adapted to the influence caused by a changing state of the noise generated by the current machine operation.

It is to be noted that the first detection result of the current floor medium provided in the foregoing embodiment is not taken as the effective detection result of the mobile robot on the current floor medium, but the to-be-adjusted detection result obtained after the second preset determination threshold is corrected is taken as the effective detection result of the mobile robot on the floor medium.

Yet another embodiment of the disclosure provides a method of detecting a floor medium. The method is used for controlling a mobile robot equipped with a sound emitter and a sound receiver to detect the floor medium in a moving process, and the mobile robot starts to detect the floor medium after being started. A basic detection principle and a using mode of the determination threshold of the method of detecting the floor medium are the same as those of the embodiment of the foregoing method for correcting a determination threshold of a floor medium, and for the sake of brevity, the part not mentioned in the embodiment may refer to corresponding content of the above embodiment.

Figure 3:
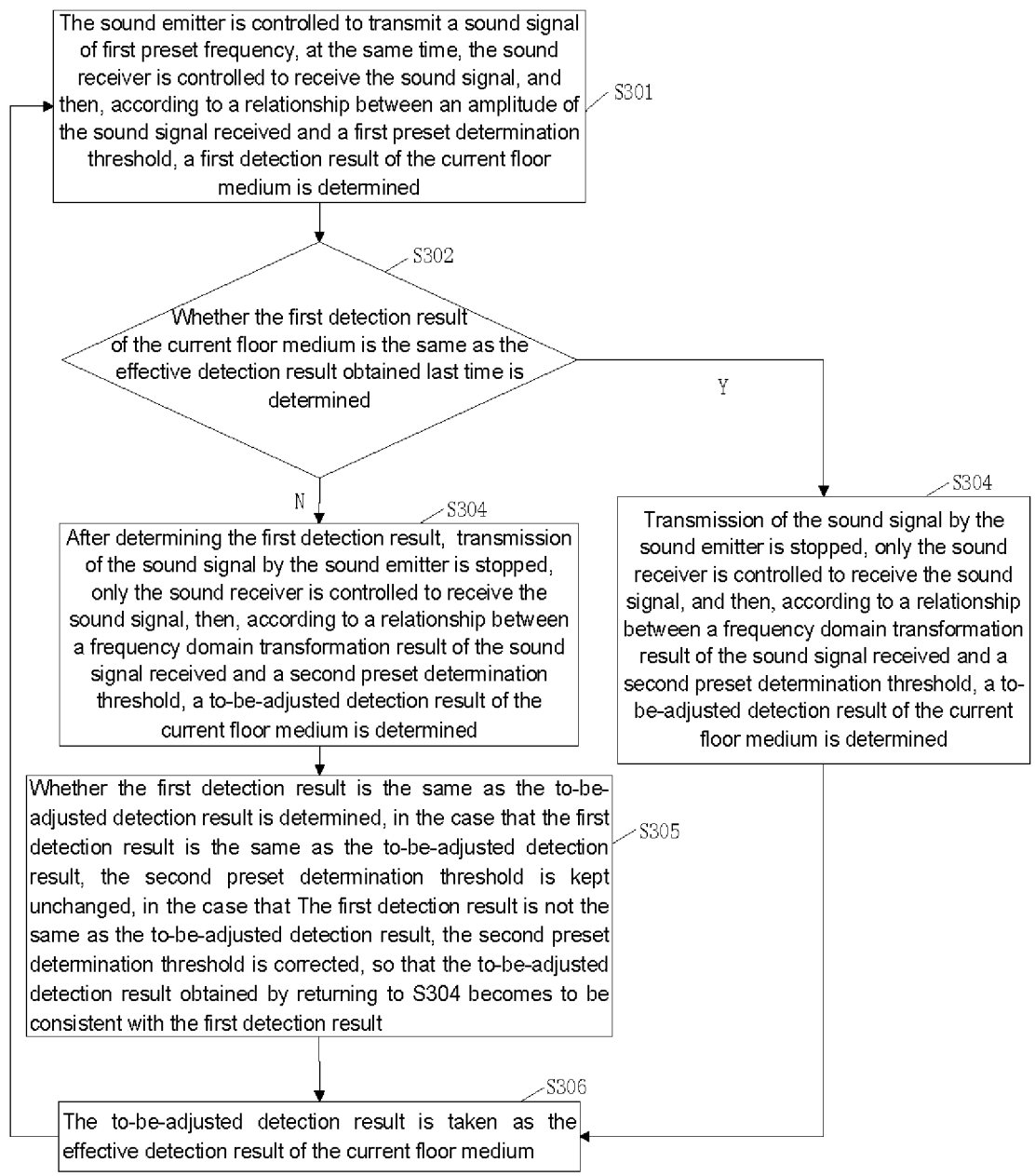
FIG. 3 is a flow chart of a method of detecting a floor medium provided by one embodiment of the disclosure.

As shown in FIG. 3, the method includes that:

S301, the sound emitter is controlled to transmit a sound signal of first preset frequency, at the same time, the sound receiver is controlled to receive a sound signal, then a first detection result of a current floor medium is determined by extracting and analyzing a relationship between an amplitude of the sound signal at the first preset frequency and a first preset determination threshold, and then S302 is entered, the first preset determination threshold is a fixed experience value obtained through an experimental test, and the first detection result is information of a type of the current floor medium. Since the sound signal of the first preset frequency is a sound wave signal of specific frequency modulated and transmitted by the sound emitter, the sound signals of the first preset frequency transmitted from the outside are very few. The sound signal at the first preset frequency is extracted and analyzed for the first time to detect that the floor medium is not influenced by the sound generated when the main brush and the fan within the mobile robot operate.

Before S301 of the embodiment, the method for correcting a determination threshold of a floor medium has been executed once, and the first detection result, the second preset determination threshold corrected and the to-be-adjusted detection result after the second preset determination threshold is corrected are reserved. When the first detection result is the same as the to-be-adjusted detection result obtained after the second preset determination threshold is corrected, the to-be-adjusted detection result obtained after the second preset determination threshold is corrected is taken as the effective detection result of the floor medium of last time, then, S301 is entered again.

S302, whether the first detection result of the current floor medium is the same as the effective detection result obtained last time is determined, in the case that the first detection result of the current floor medium is the same as the effective detection result obtained last time, the current floor medium is not changed, S303 is entered, in the case that the first detection result of the current floor medium is not the same as the effective detection result obtained last time, the current floor medium is changed, S304 is entered, and equivalently, the foregoing S205 to S218 need to be executed once.

S304, after determining the first detection result, transmission of the sound signal by the sound emitter is stopped, only the sound receiver is controlled to receive the sound signal, then, according to the relationship between a frequency domain transformation result of the sound signal received and a second preset determination threshold, a to-be-adjusted detection result of the current floor medium is determined, and then 305 is entered, the second preset determination threshold supports adjustment and correction, and the to-be-adjusted detection result is information of the type of the current floor medium. A type of the current floor medium is determined through the first detection in S301. This result is not influenced by the sound generated by when the main brush and the fan within the mobile robot operate. After the first detection is completed, the transmission of the sound signal by the sound emitter is stopped, only the sound receiver is controlled to receive the sound signal, and at the moment, the sound signals collected mainly come from the noise of the main brush of the machine. In a process of determining the first detection result, a moving distance of the mobile robot is small, it may be considered that floor material is not changed. That is, the mobile robot does not move from the hard floor to the carpet, or from the carpet to the hard floor. The floor medium is then detected again by analyzing the received sound signal. Frequency domain transformation is performed on the sound signal received, and an amplitude value of the to-be-detected frequency domain signal of second preset frequency is extracted from a frequency domain. According to the relationship between the amplitude value of the to-be-detected frequency domain signal of second preset frequency and the second preset determination threshold, the to-be-adjusted detection result of the current floor medium is determined.

S305, whether the first detection result is the same as the to-be-adjusted detection result is determined, in the case that the first detection result is the same as the to-be-adjusted detection result, the second preset determination threshold is kept unchanged, in the case that the first detection result is not the same as the to-be-adjusted detection result, the second preset determination threshold is corrected, so that the to-be-adjusted detection result obtained by returning to S304 to detect sound signal reflected on the same floor medium in real time becomes to be consistent with the first detection result, and then S306 is entered. If the first detection result is determined to be different from the to-be-adjusted detection result, the second preset determination threshold is corrected first to be less than the frequency domain transformation result of the sound signal currently received, and then S304 is returned to determine the to-be-adjusted detection result. The second preset determination threshold may also be corrected first according to an adjustable margin, and then S304 is returned to compare the second preset determination threshold corrected with the frequency domain transformation result of the sound signal received in real time. The second preset determination threshold is an adjustable margin, and the adjustable margin is an experience range value obtained through an experimental test at a certain proportion according to the frequency domain transformation result of the sound signal received. An initial value of the second preset determination threshold is set in a factory state of the machine.

S303, the transmission of the sound signal by the sound emitter is stopped, only the sound receiver is controlled to receive the sound signal, then, according to the relationship between the frequency domain transformation result of the sound signal received and the second preset determination threshold, a to-be-adjusted detection result of the current floor medium is determined, and then 306 is entered, the second preset determination threshold supports adjustment and correction, and the to-be-adjusted detection result is information of the type the current floor medium. A type of the current floor medium is determined through the first detection in S301. This result is not influenced by the sound generated by when the main brush and the fan within the mobile robot operate. After the first detection is completed, the transmission of the sound signal by the sound emitter is stopped, only the sound receiver is controlled to receive the sound signal, and at the moment, the collected sound signals mainly come from the noise of the main brush of the machine. In a process of determining the first detection result, the moving distance of the mobile robot is small, it may be considered that floor material is not changed. That is, the mobile robot does not move from the hard floor to the carpet, or from the carpet to the hard floor. The floor medium is then detected again by analyzing the received sound signal. Frequency domain transformation is performed on the sound signal received, and the amplitude value of the to-be-detected frequency domain signal of second preset frequency is extracted from a frequency domain. According to the relationship between the amplitude value of the to-be-detected frequency domain signal of second preset frequency and the second preset determination threshold, the to-be-adjusted detection result of the current floor medium is determined.

S306, the to-be-adjusted detection result consistent with the first detection result obtained in S301 is determined to be the effective detection result of the current floor medium, and then S301 is returned to continue to complete the detection of the floor medium. The effective detection result of the current floor medium is a detection result which influences a moving strategy of the mobile robot on the current floor medium.

The to-be-adjusted detection result not only comes from S305 executed in the case of crossing different floor media, but also comes from S303 executed in the case of the same floor medium. When the to-be-adjusted detection result comes from S305 executed in the case of crossing different floor media, the to-be-adjusted detection result is the to-be-adjusted detection result obtained by re-executing S205 to S218 once after the determination threshold is corrected, then the effective detection result of the floor medium of last time is updated with the to-be-adjusted detection result, and the to-be-adjusted detection result is taken as the effective detection result of the current floor medium. When the to-be-adjusted detection result comes from S303 executed in the case of the same floor medium, the second preset determination threshold does not need to be corrected, the second preset determination threshold is directly used to participate in executing S303 so as to obtain the to-be-adjusted detection result, then the effective detection result of the floor medium of last time is updated with the to-be-adjusted detection result, and the to-be-adjusted detection result is taken as the effective detection result of the current floor medium.

In the embodiment, in a process that the mobile robot may be started and cross different floor media subsequently, a preset determination threshold is dynamically adjusted on the basis of determining the first detection result, the influence caused by sound difference generated by machine aging is overcome, the method of detecting is suitable for accurately detecting and identifying whether the current floor medium is carpet in various machine aging states, and further, the mobile robot is controlled to avoid the carpet in real time in a cleaning working process.

Specifically, in S305, in a case that the first detection result is the carpet and the to-be-adjusted detection result is the hard floor, the second preset determination threshold is increased until an amplitude value of a to-be detected frequency domain signal of the second preset frequency is less than the second preset determination threshold, S304 is returned to determine that the to-be-adjusted detection result is changed from the hard floor to the carpet, and the carpet is taken as an effective detection result of the current floor medium; in a case that the first test result is the carpet and the to-be-adjusted test result is the carpet, the second preset determination threshold is kept unchanged, and the carpet is taken as the effective detection result of the current floor medium; in a case that the first detection result is the hard floor and the to-be-adjusted detection result is the carpet, the second preset determination threshold is reduced until the amplitude value of the to-be detected frequency domain signal of the second preset frequency is greater than the second preset determination threshold, then S304 is returned to determine that the to-be-adjusted detection result is changed from the carpet to the hard floor, and the hard floor is taken as the effective detection result of the current floor medium; and in a case that the first detection result is the hard floor and the to-be-adjusted detection result is the hard floor, the second preset determination threshold is kept unchanged, and the hard floor is taken as the effective detection result of the current floor medium. It is to be noted that a basic principle of S304 and S305 is equivalent to S205 to S218 of the foregoing embodiment.

Compared with the conventional art that adopting a fixed preset determination threshold at the factory, the embodiment has the following advantage that by comparing the first detection result with the to-be-detected result, the second preset determination threshold is corrected in the case that only the sound receiver is controlled to passively receive the sound signal, so that the to-be-detected result is adapted to the influence caused by a changing state of the noise generated by the current machine operation, and the detection and identification capability of the mobile robot to the floor medium under various machine aging states is improved.

Finally, it is to be noted that: the above embodiments are only intended to illustrate the technical solution of the disclosure and not to limit the same. Although the disclosure has been described in detail with reference to the preferred embodiments, those skilled in the art will appreciate that: modifications may be made to the specific embodiments of the disclosure or equivalent replacement may be performed on some of the technical features without departing from the spirit of the technical solution of the disclosure, and all those modifications and the equivalent replacement should be included within the scope of the technical solution as claimed by the disclosure.

What is claimed is:

1. A method for correcting a determination threshold of a floor medium, wherein the method is used for controlling a mobile robot equipped with a sound emitter and a sound receiver to correct a parameter for detecting the floor medium during a just started movement;

the method comprises:
S1, controlling the sound emitter to transmit a sound signal of a first preset frequency, at the same time, controlling the sound receiver to receive the sound signal, and then, determining a first detection result of a current floor medium according to a relationship between an amplitude of the sound signal received and a first preset determination threshold; wherein the first preset determination threshold is a fixed experience value obtained through an experimental test, the first detection result is information of a type of the current floor medium;

S2, after determining the first detection result, stopping transmission of the sound signal by the sound emitter, only controlling the sound receiver to receive the sound signal, and then determining a to-be-adjusted detection result of a current floor medium according to a relationship between a frequency domain transformation result of the sound signal received and a second preset determination threshold; wherein the second preset determination threshold supports correction, the to-be-adjusted detection result is the information of the type of the current floor medium; wherein the current floor medium in S1 and the current floor medium in S2 are floor mediums at different times; wherein after the sound emitter stops transmitting the sound signal, the sound signal received by the sound receiver includes the noise of a main brush of the mobile robot; and S3, determining whether the first detection result is the same as the to-be-adjusted detection result, in the case that the first detection result is the same as the to-be-adjusted detection result, keeping the second preset determination threshold unchanged, and in the case that the first detection result is not the same as the to-be-adjusted detection result, correcting the second preset determination threshold so that the to-be-adjusted detection result obtained by returning to S2 is consistent with the first detection result, wherein the second preset determination threshold is an adjustable margin; and controlling the mobile robot based on detected result of the current floor medium.

2. The method of claim 1, wherein in S1, determining the first detection result of the current floor medium according to the relationship between the amplitude of the sound signal received and the first preset determination threshold comprises:

extracting an amplitude of a to-be-detected signal of the first preset frequency from the sound signal received in S1; and determining whether the amplitude of the to-be-detected signal of the first preset frequency is less than the first preset determination threshold, in the case that the amplitude of the to-be-detected signal of the first preset frequency is less than the first preset determination threshold, determining the first detection result of the current floor medium to be a carpet, in the case that the amplitude of the to-be-detected signal of the first preset frequency is not less than the first preset determination threshold, determining the first detection result of the current floor medium to be a hard floor;

wherein the first preset determination threshold is used for measuring an attenuation capacity of the current floor medium to the to-be-detected signal of the first preset frequency, and the sound signal of the first preset frequency is a sound wave signal of a special frequency modulated and transmitted by the sound emitter.

3. The method of claim 2, wherein in S2, determining the to-be-adjusted detection result of the current floor medium according to the relationship between the frequency domain transformation result of the sound signal received and the second preset determination threshold comprises:

performing frequency domain transformation of the sound signal received in S2, and extracting an amplitude value of a to-be-detected frequency domain signal of a second preset frequency; and determining whether the amplitude value of the to-be-detected frequency domain signal of the second preset frequency is less than the second preset determination threshold, in the case that the amplitude value of the to-be-detected frequency domain signal of the second preset frequency is less than the second preset determination threshold, determining the to-be-adjusted detection result of the current floor medium to be the carpet, and in the case that the amplitude value of the to-be-detected frequency domain signal of the second preset frequency is not less than the second preset determination threshold, determining the to-be-adjusted detection result of the current floor medium to be the hard floor;

wherein the second preset determination threshold is used for measuring an attenuation capability of the current floor medium to the sound signal of a high frequency band, the second preset frequency is a high frequency component in a response frequency band obtained through the frequency domain transformation of the sound signal received by the sound receiver in real time.

4. The method of claim 3, wherein in S3, correcting the second preset determination threshold comprises:

in a case that the first detection result is the carpet and the to-be-adjusted detection result is the hard floor, increasing the second preset determination threshold until the amplitude value of the to-be-detected frequency domain signal of the second preset frequency is less than the second preset determination threshold, so that the to-be-adjusted detection result obtained by returning to S2 is determined to be the same as the first detection result;

in a case that the first detection result is the carpet and the to-be-adjusted detection result is the carpet, keeping the second preset determination threshold unchanged, so that the to-be-adjusted detection result obtained by returning to S2 is kept unchanged;

in a case that the first detection result is the hard floor and the to-be-adjusted detection result is the carpet, reducing the second preset determination threshold until the amplitude value of the to-be-detected frequency domain signal of the second preset frequency is greater than the second preset determination threshold, so that the to-be-adjusted detection result obtained by returning to S2 is determined to be the same as the first detection result; and in a case that the first detection result is the hard floor and the to-be-adjusted detection result is the hard floor, keeping the second preset determination threshold unchanged, so that the to-be-adjusted detection result obtained by returning to S2 is kept unchanged;

wherein the amplitude value of the to-be-detected frequency domain signal of the second preset frequency is a signal amplitude value which is received by the sound receiver in real time and obtained through the frequency domain transformation.

5. The method of claim 4, wherein the adjustable margin has a proportional relationship with the amplitude value of the to-be-detected frequency domain signal of the second preset frequency obtained through real-time processing.

6. A method of detecting a floor medium, wherein the method is used for controlling a mobile robot equipped with a sound emitter and a sound receiver to detect the floor medium in a moving process, wherein the mobile robot starts to detect the floor medium after being started;

the method comprising:

S101, controlling the mobile robot to execute the method for correcting a determination threshold of the floor medium, wherein the method for correcting a determination threshold of the floor medium comprises:

S1, controlling the sound emitter to transmit a sound signal of a first preset frequency, at the same time, controlling the sound receiver to receive the sound signal, and then, determining a first detection result of a current floor medium according to a relationship between an amplitude of the sound signal received and a first preset determination threshold; wherein the first preset determination threshold is a fixed experience value obtained through an experimental test, the first detection result is information of a type of the current floor medium;

S2, after determining the first detection result, stopping transmission of the sound signal by the sound emitter, only controlling the sound receiver to receive the sound signal, and then determining a to-be-adjusted detection result of a current floor medium according to a relationship between a frequency domain transformation result of the sound signal received and a second preset determination threshold; wherein the second preset determination threshold supports correction, the to-be-adjusted detection result is the information of the type of the current floor medium; wherein the current floor medium in S1 and the current floor medium in S2 are floor mediums at different times; wherein after the sound emitter stops transmitting the sound signal, the sound signal received by the sound receiver includes the noise of a main brush of the mobile robot; and S3, determining whether the first detection result is the same as the to-be-adjusted detection result, in the case that the first detection result is the same as the to-be-adjusted detection result, keeping the second preset determination threshold unchanged, and in the case that the first detection result is not the same as the to-be-adjusted detection result, correcting the second preset determination threshold so that the to-be-adjusted detection result obtained by returning to S2 is consistent with the first detection result, wherein the second preset determination threshold is an adjustable margin;

S102, in the case that the first detection result is the same as the to-be-adjusted detection result, taking the to-be-adjusted detection result as an effective detection result of the current floor medium, and returning to S1;

S103, determining whether the first detection result obtained in S1 is the same as the effective detection result of the current floor medium, in the case that the first detection result obtained in S1 is the same as the effective detection result of the current floor medium, continuing to execute S2, and updating the effective detection result of the current floor medium with the to-be-adjusted detection result obtained in S2, in the case that the first detection result obtained in S1 is not the same as the effective detection result of the current floor medium, continuing to execute S2 and S3, and then returning to S102;

wherein the effective detection result of the current floor medium is a detection result which influences a moving strategy of the mobile robot on the current floor medium; and controlling the mobile robot based on detected result of the current floor medium.

7. The method of claim 6, wherein in the case that the first detection result obtained in S1 is not the same as the effective detection result of the current floor medium, continuing to execute S2 and S3, and then returning to S102 comprises:

in a case that the first detection result is a carpet and the to-be-adjusted detection result is a hard floor, increasing a second preset determination threshold until an amplitude value of a to-be detected frequency domain signal of a second preset frequency is less than the second preset determination threshold, then returning to S2 to determine that the to-be-adjusted detection result is changed from the hard floor to the carpet, and taking the carpet as the effective detection result of the current floor medium;

in a case that the first test result is the carpet and the to-be-adjusted test result is the carpet, keeping the second preset determination threshold unchanged, and taking the carpet as the effective detection result of the current floor medium;

in a case that the first detection result is the hard floor and the to-be-adjusted detection result is the carpet, reducing the second preset determination threshold until the amplitude value of the to-be detected frequency domain signal of the second preset frequency is greater than the second preset determination threshold, then returning to S2 to confirm that the to-be-adjusted detection result is changed from the carpet to the hard floor, and taking the hard floor as the effective detection result of the current floor medium; and in a case that the first detection result is the hard floor and the to-be-adjusted detection result is the hard floor, keeping the second preset determination threshold unchanged, and taking the hard floor as the effective detection result of the current floor medium.

8. The method of claim 6, wherein in S1, determining the first detection result of the current floor medium according to the relationship between the amplitude of the sound signal received and the first preset determination threshold comprises:

extracting an amplitude of a to-be-detected signal of the first preset frequency from the sound signal received in S1; and determining whether the amplitude of the to-be-detected signal of the first preset frequency is less than the first preset determination threshold, in the case that the amplitude of the to-be-detected signal of the first preset frequency is less than the first preset determination threshold, determining the first detection result of the current floor medium to be a carpet, in the case that the amplitude of the to-be-detected signal of the first preset frequency is not less than the first preset determination threshold, determining the first detection result of the current floor medium to be a hard floor;

wherein the first preset determination threshold is used for measuring an attenuation capacity of the current floor medium to the to-be-detected signal of the first preset frequency, and the sound signal of the first preset frequency is a sound wave signal of a special frequency modulated and transmitted by the sound emitter.

9. The method of claim 8, wherein in S2, determining the to-be-adjusted detection result of the current floor medium according to the relationship between the frequency domain transformation result of the sound signal received and the second preset determination threshold, comprises:

performing frequency domain transformation of the sound signal received in S2, and extracting an amplitude value of a to-be-detected frequency domain signal of a second preset frequency; and determining whether the amplitude value of the to-be-detected frequency domain signal of the second preset frequency is less than the second preset determination threshold, in the case that the amplitude value of the to-be-detected frequency domain signal of the second preset frequency is less than the second preset determination threshold, determining the to-be-adjusted detection result of the current floor medium to be the carpet, and in the case that the amplitude value of the to-be-detected frequency domain signal of the second preset frequency is not less than the second preset determination threshold, determining the to-be-adjusted detection result of the current floor medium to be the hard floor;

wherein the second preset determination threshold is used for measuring an attenuation capability of the current floor medium to the sound signal of a high frequency band, the second preset frequency is a high frequency component in a response frequency band obtained through the frequency domain transformation of the sound signal received by the sound receiver in real time.

10. The method of claim 9, wherein in S3, correcting the second preset determination threshold comprises:

in a case that the first detection result is the carpet and the to-be-adjusted detection result is the hard floor, increasing the second preset determination threshold until the amplitude value of the to-be-detected frequency domain signal of the second preset frequency is less than the second preset determination threshold, so that the to-be-adjusted detection result obtained by returning to S2 is determined to be the same as the first detection result;

in a case that the first detection result is the carpet and the to-be-adjusted detection result is the carpet, keeping the second preset determination threshold unchanged, so that the to-be-adjusted detection result obtained by returning to S2 is kept unchanged;

in a case that the first detection result is the hard floor and the to-be-adjusted detection result is the carpet, reducing the second preset determination threshold until the amplitude value of the to-be-detected frequency domain signal of the second preset frequency is greater than the second preset determination threshold, so that the to-be-adjusted detection result obtained by returning to S2 is determined to be the same as the first detection result; and in a case that the first detection result is the hard floor and the to-be-adjusted detection result is the hard floor, keeping the second preset determination threshold unchanged, so that the to-be-adjusted detection result obtained by returning to S2 is kept unchanged;

wherein the amplitude value of the to-be-detected frequency domain signal of the second preset frequency is a signal amplitude value which is received by the sound receiver in real time and obtained through the frequency domain transformation.

11. The method of claim 10, wherein the adjustable margin has a proportional relationship with the amplitude value of the to-be-detected frequency domain signal of the second preset frequency obtained through real-time processing.

* * * * *